US00RE37266E

(19) United States
(12) Reissued Patent
Te Dorsthorst et al.

(10) Patent Number: US RE37,266 E
(45) Date of Reissued Patent: Jul. 3, 2001

(54) METHOD AND DEVICE FOR STUNNING AN ANIMAL FOR SLAUGHTER

(75) Inventors: Wilhelmus A. B. Te Dorsthorst, Lichtenvoorde; Hendrik J. Pardijs, Winterswijk, both of (NL)

(73) Assignee: Stork RMS B.V. (NL)

(21) Appl. No.: 09/203,427

(22) Filed: Dec. 1, 1998

Related U.S. Patent Documents

Reissue of:
(64) Patent No.: 5,486,145
Issued: Jan. 23, 1996
Appl. No.: 08/435,172
Filed: May 5, 1995

U.S. Applications:

(63) Continuation of application No. 08/033,185, filed on Mar. 16, 1993, now abandoned.

(30) Foreign Application Priority Data

Mar. 16, 1992 (NL) ..... 9200487

(51) Int. Cl.[7] ..... A22B 3/06
(52) U.S. Cl. ..... 452/58
(58) Field of Search ..... 452/58, 57

(56) References Cited

U.S. PATENT DOCUMENTS

| | | | |
|---|---|---|---|
| 1,935,138 | 11/1933 | Winsch | 175/311 |
| 4,524,487 | 6/1985 | Gossens | 452/58 |
| 4,571,777 | 2/1986 | Nijhuis | 452/58 |
| 4,578,841 | 4/1986 | Nijhuis | 452/58 |
| 4,586,216 | 5/1986 | Grajoszex | 452/58 |

FOREIGN PATENT DOCUMENTS

| | | | |
|---|---|---|---|
| 3599284 | 11/1983 | (AU) | A22B/3/06 |
| 571286 | 4/1988 | (AU) | D22B/7/100 |
| 1632084 | 6/1971 | (DE) | 452/58 |
| 3909833 | 3/1990 | (DE) | 452/58 |
| 4037203 | 5/1992 | (DE) | 452/58 |
| 0019332 | 11/1980 | (EP) . | |
| 0021548 | 4/1984 | (EP) | 452/58 |
| 190780 | 8/1986 | (EP) | 452/58 |
| 680889 | 5/1930 | (FR) | 452/58 |
| 2390903 | 9/1979 | (FR) | A22B/3/08 |
| 7903681 | 11/1980 | (NL) . | |
| 201402 | 5/1986 | (NZ) | A22B/3/06 |

OTHER PUBLICATIONS

EPO Search Report dated Jun. 2, 1993.*

* cited by examiner

*Primary Examiner*—Willis Little
(74) *Attorney, Agent, or Firm*—Brinks Hofer Gilson & Lione

(57) ABSTRACT

A method of stunning an animal for slaughter includes the steps of providing the animal for slaughter; conveying the animal using conveying means; while conveying, causing a first current pulse having a maximum duration of 10 seconds to flow through the head and/or neck region of the animal to stun the animal; and, while conveying, causing a second current pulse to flow through the body of the animal to cause a cardiac arrest. The first and second current pulses may be applied successively or may be overlapping or partly overlapping.

19 Claims, 2 Drawing Sheets

METHOD AND DEVICE FOR STUNNING AN ANIMAL FOR SLAUGHTER

Matter enclosed in heavy brackets [ ] appears in the original patent but forms no part of this reissue specification; matter printed in italics indicates the additions made by reissue.

RELATED APPLICATIONS

This application is a continuation of U.S. patent application Ser. No. 08/033,185, filed on Mar. 16, 1993 now abandoned.

The invention relates to the stunning of an animal for slaughtering, for instance a pig.

It is generally known that electricity is a very suitable means of stunning an animal for slaughter.

BACKGROUND AND SUMMARY OF THE INVENTION

The invention relates to a method for stunning an animal for slaughter, e.g. a pig, comprising the steps of:

(a) providing the animal for slaughter;

(b) conveying said animal by means of conveying means in the direction of stunning means;

(c) causing a first current pulse to flow through the neck- and/or head-region of said animal for slaughter to stun said animal; and (d) causing a second current pulse to flow through the body of the animal for slaughter to cause a cardiac arrest.

Also the invention relates to a device for stunning an animal for slaughter, for instance a pig, for application of the method specified herein above, said device comprising;

(a) conveying means for conveying an animal for slaughter;

(b) at least one first electrode to be pressed against the neck- and/or head-region of the animal;

(c) electrical supply means connected to said first electrode for causing a first current pulse to flow through the at least one first electrode through the neck- and/or head-region of the animal; and (d) at least one second electrode to be pressed against the body of the animal, said electrical supply means being also connected to said at least one second electrode for causing a second current pulse to flow via said at least one second electrode through the body of the animal to cause cardiac arrest.

Such a method and a device are known from NZ-A-201 402.

The invention has for its object to provide a method and associated device with which an animal for slaughter can be rapidly stunned using simple means, wherein needless suffering is prevented and the quality of the meat is not adversely affected. In addition to achieving effective stunning it is important that the animal remains substantially still after the treatment. This is important in respect of the subsequent treatment which, in accordance with a normal procedure, consists of arranging a chain around one of the hind legs, suspending from the conveyor and subsequently piercing the carotid artery to kill the animal.

Furthermore, the invention has for its object to provide a method and associated device with which the stunning of the animal for slaughter can take place during the transporting of the animal by means of conveying means, such as a restrainer, without the necessity of stopping the transport during the stunning operation. In this connection it should be noted that, for an efficient management of the stunning operation in the abattoir, the continuity of the supply of animals to be slaughtered to the conveyor must not be interrupted.

With the above in mind the method according to the invention is characterized by a step (e) of carrying out step (c) in a way such that the first current pulse has a maximum duration of 10 seconds and by steps (c) and (d) being executed during step (b).

Use of the method according to the invention can very effectively prevent the animal displaying so-called "clonic spasms" and the animal remains virtually motionless while stunning is nonetheless complete.

Particularly effective is the method wherein the second current pulse is caused to flow through the heart region.

This method can for instance be performed such that the second current pulse is caused to flow through the neck- and/or head-region and the heart region of the animal.

The first and the second current pulse can have a duration of a maximum of 10 secs. and preferably a duration of 1–2 secs. The total duration of the first and the second current pulse together is preferably 2.5–3 secs.

The effective voltage of the first current pulse and of the second current pulse is preferably a maximum of 1000 V.

Excellent results are obtained with methods in which the voltage of the first current pulse lies in the order of magnitude of 250 V and that of the second current pulse in the order of magnitude of 125 V.

The first and second current pulse can each consist of an alternating current with a frequency of a maximum of 1000 Hz.

A method in which these frequencies are the same as the mains frequency has the advantage of easy availability.

Attention is drawn to the fact that in general preference will be given to an alternating current.

From EP-A-0 019 332 an apparatus is known in which electrodes adapted to engage the head of an animal to be stunned are movable along a restrainer in a reciprocating fashion. No electrodes engaging the breast or other part of the body of an animal is used.

EP-A-0 021 548 also relates to such a device in which the head electrode said is movable together with the animal carried by the restrainer. No breast electrode is used.

FR-A-2 390 903 relates to a device in which, the electrodes are carried by hingible arms, so that they can more or less follow the movement of an animal during the stunning operation.

The method according to the invention is implemented in material sense with a device for stunning an animal for slaughter, for instance a pig, with application of the method as described above, said device being characterized in that: the first and second electrodes are movable together with said conveying means.

It should be noted that the apparatus known from NZ-A-201 402 for stunning an animal and causing cardiac arrest uses a current flowing through electrodes arranged in the head and the breast region of an animal, respectively. These electrodes are not movable together with a conveyor, but are rather positioned in a fixed stationary position.

While the use of a relatively high voltage can achieve a good stunning, internal bleeding could occur as a side-effect which could adversely affect the quality of the meat. A relatively low voltage for the first and the second current pulses is therefore the objective. In order to further the quality of the stunning, however, the device according to the invention is characterized in a variant by means for lowering the transition resistance between the electrodes and the animal. This ensures that at a determined voltage a desired strength of current can be obtained.

The device according to the invention can be characterized particularly for this purpose by pressing means for pressing the electrodes against the animal with chosen forces.

In order to induce cardiac arrest as effectively as possible the device can have the feature that the third electrode is adapted to be pressed against the thorax region of the animal such that the second current pulse is caused to flow to at least a significant degree through the heart region.

In a specific embodiment the device characterized in that the at least one first electrode is carried by a first carriage which can be moved reciprocally along said conveyor such that said at least one first electrode can make contact with an animal for slaughter carried by said conveyor during the first current pulse having a maximum duration of 10 secs.

Correspondingly, the device may be characterized in that the second electrode is carried by a second carriage which can be moved reciprocally along said conveyour such that said second electrode can make contact with an animal for slaughter carried by said conveyor during the second current pulse having a maximum duration of 10 secs.

In a simple yet effective embodiment, the device is characterized in that said first and second carriages are coupled for simultaneous reciprocating movement along said conveyor.

In yet another embodiment the device is characterized in that said first carriage is also said second carriage.

In yet another embodiment the device is characterized in that said at least one second electrode forms part of the outer surface of said conveyor. It can be practical to use an external electrical contact connected with the power supply for supplying the second current pulse in a way such that said second electrode is connected with the power supply only during a predetermined time interval. The second current pulse is fed to the second electrode only during that interval.

BRIEF DESCRIPTION OF THE DRAWINGS

The invention will now be further elucidated with reference to the annexed drawings, wherein.

DETAILED DESCRIPTION OF THE PRESENTLY PREFERRED EMBODIMENTS

Figure 1:
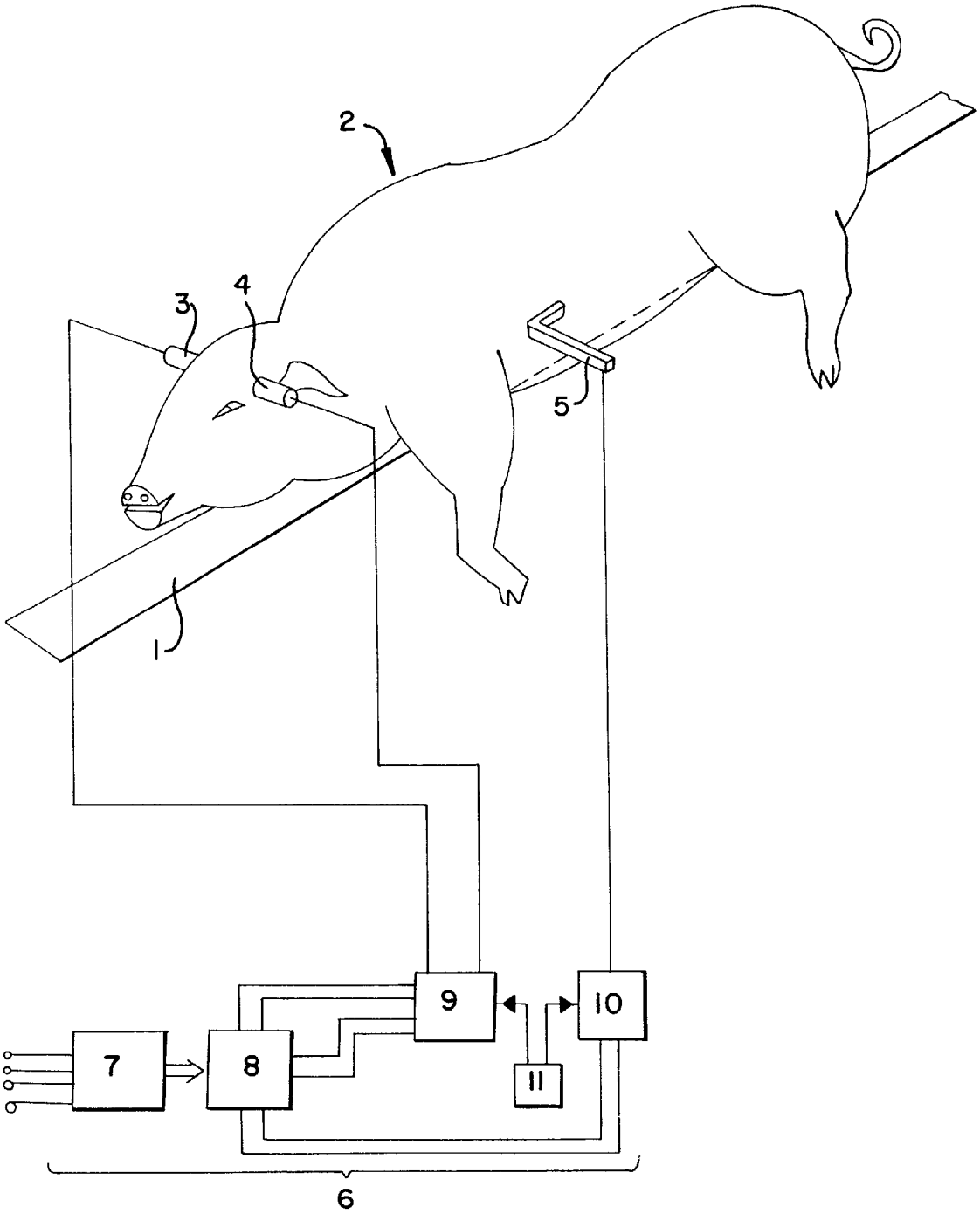
FIG. 1 shows a perspective view of a pig lying on a restrainer, wherein a device according to the invention is shown highly schematically in operating situation.

Lying on a conveyor belt 1, a so-called restrainer, is a pig 2 which is to be stunned and slaughtered. According to the invention use is made for this purpose of a number of electrodes, in the embodiment drawn two head electrodes 3, 4 and a breast electrode 5, which are connected to an electrical mains supply device 6 for successively causing to flow a current pulse through the head of the pig 2 via the electrodes 3 and 4 and then causing a second current pulse to flow through the heart region of the animal via the electrode 5 and at least one of both electrodes 3, 4. In FIG. 1 the reference numeral 7 designates a mains transformer which provides a power supply source 8 with the correct voltage and current. The electrodes 3 and 4 receive current via a first switch 9, while passage of current via the third electrode 5 is controlled by a second switch 10. These switches are controlled by a control unit 11 which ensures that a first current pulse is caused to flow through electrodes 3, 4 followed by a second current pulse via respectively the head electrodes 3 and/or 4 and the breast electrode 5.

Figure 2:
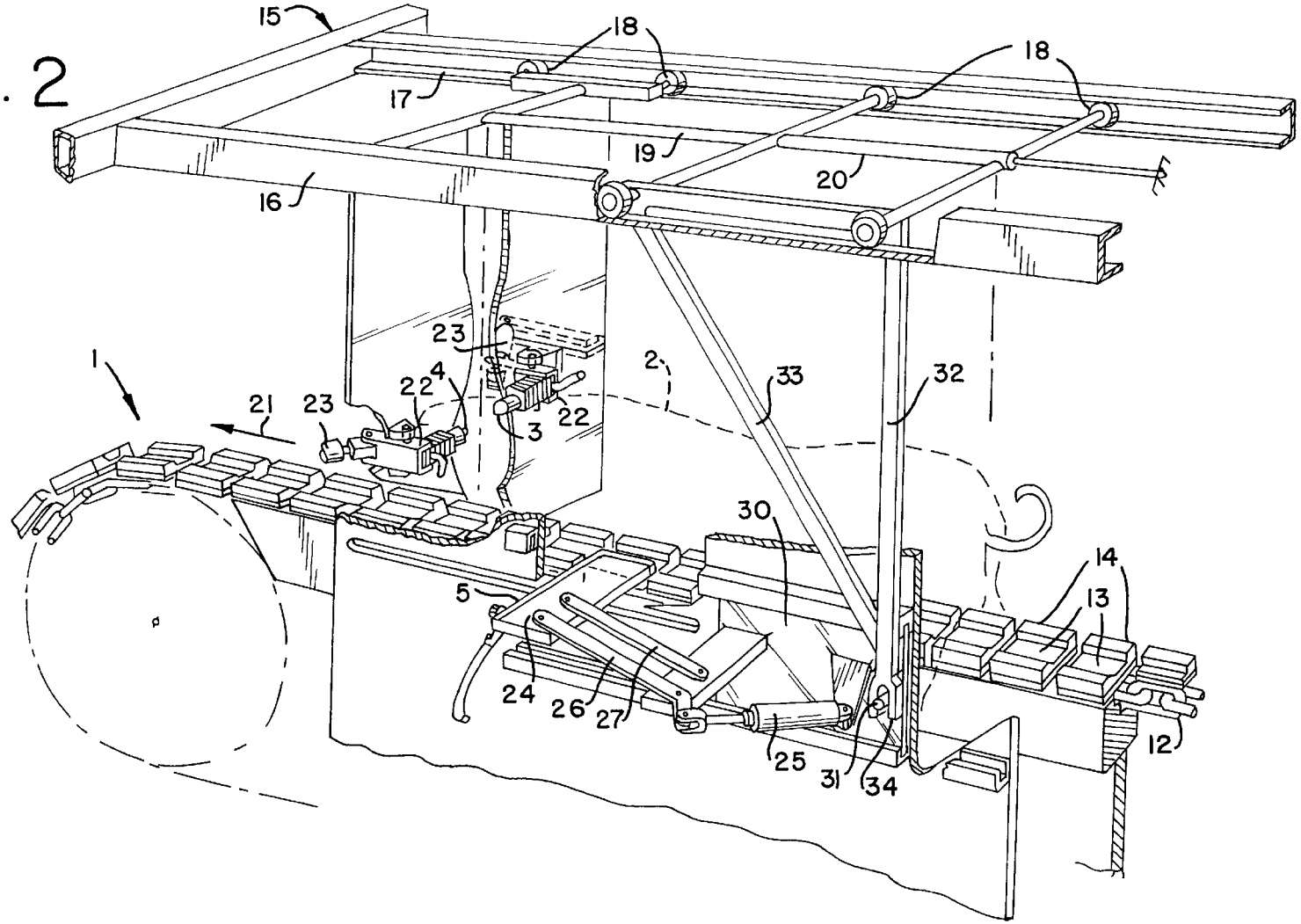
FIG. 2 shows a partly broken away perspective view of a practical embodiment of the device.

For the sake of clarity the power supply device 6 is not drawn in FIG. 2.

The conveyor 1 comprises a chain 12 which is driven by non-drawn means and bears blocks 14 each provided with a central longitudinal recess 13. The longitudinal recess 13 has a form such that the breast bone of pig 2 can be accommodated therein. This conveyor has a construction such that the pig remains lying docilely thereon in a fixed position.

Via a frame 15 with rails 16, 17 a carriage 19 is displacable by means of wheels 18 in lengthwise direction with conveyor 1. This carriage 19 can be driven by a cylinder 20 which is energized by non-drawn means for reciprocating displacement of carriage 19. Because the carriage 19 is driven in the transporting direction 21 at the same speed as conveyor 1 the electrodes 3, 4, 5, after having been placed in the desired position, can move along with the pig 2 for a period of time.

The electrodes 3, 4 are carried by a pivot arm 22 which is pivotable by means of cylinders 23, the driving whereof is likewise not drawn. Herewith the electrodes 3, 4 can be arranged with some force against the head of pig 2.

Electrode 5 is carried by a plate 24 which is movable toward and away from pig 2 by means of a cylinder 25. This latter engages onto an arm 26 which, together with an arm 27 parallel thereto, supports the plate 24. The electrode 5 is through plate 24 and arms 26, 27 supported by a second carriage 30 provided with a pin 31 cooperating with a driving arm 32 connected with carriage 19 for reasons of mechanical stiffness, the arm 32 is supported by a stiffening arm 33 extending between the frame 39 and the lower end of arm 32, which has a fork-shaped end 34 cooperating with pin 31. Thus, carriages 19 and 30 are driven simultaneously by cylinder 20 with the same speed as the conveyor 1 speed.

By making use of the above described constructions the electrodes 3, 4, 5 can be pressed with a sufficiently great pressure against the pig 2, whereby the transition resistance between the electrodes and the pig remains limited and a relatively high current can be realized at a relatively low voltage.

We claim:

1. A method for stunning an animal which has a head, a neck, and a main body, comprising the steps of:

a) providing the animal for slaughter on a conveyor;

b) moving the animal on the conveyor toward a destination;

c) causing a first current pulse to flow through the head and/or neck of the animal to stun the animal; and d) causing a second current pulse to flow through the body of the animal to cause a cardiac arrest;

wherein step c) is carried out with an effective voltage of a maximum of 1000 volts and with the first current pulse having a maximum duration of 10 seconds;

wherein steps (c) and (d) are executed during step (b); and wherein step (d) has a duration of a maximum of 10 seconds.

2. Method as claimed in claim 1, wherein the second current pulse is caused to flow through a heart region of the animal.

3. Method as claimed in claim 2, wherein the second current pulse is also caused to flow through the neck and/or head of the animal.

4. Method as claimed in claim 1, wherein step (c) has a duration of 1–2 secs.

5. Method as claimed in claim 1, wherein step (c) is carried out with an effective voltage on the order of magnitude of 250 V.

6. Method as claimed in claim 1, wherein step (d) has a duration of 1–2 secs.

7. Method as claimed in claim 1, wherein the steps (c) and (d) together have a duration of 2.5–3 secs.

8. Method as claimed in claim 1, wherein step (d) is carried out with an effective voltage of a maximum of 1000 V.

9. Method as claimed in claim 7, wherein step (d) is carried out with an effective voltage on the order of magnitude of 125 V.

10. Method as claimed in claim 1, wherein the first current pulse consists of an alternating current with a frequency of a maximum of 1000 Hz.

11. Method as claimed in claim 10, wherein the first current pulse consists of an alternating current with a frequency having the value of a mains frequency.

12. Method as claimed in claim 1, wherein the second current pulse consists of an alternating current with a frequency of a maximum of 1000 Hz.

13. Method as claimed in claim 12, wherein the second current pulse consists of an alternating current with a frequency having the value of a mains frequency.

14. An apparatus for stunning an animal having a head, a neck, and a main body, comprising:

a) a conveyor for transporting the animal for slaughter;

b) at least one first electrode for engaging the head and/or neck of the animal being transported on the conveyor;

c) an electrical supply connected to the first electrode for causing a first current pulse to flow through the first electrode and into the head and/or neck of the animal;

d) at least one second electrode for engaging the body of the animal, the electrical supply being further connected to the second electrode for causing a second current pulse to flow through the second electrode and into the body of the animal and cause a cardiac arrest;

wherein the first and second electrodes are movable together with the conveyor in a direction of transport of the animal, wherein the at least one first electrode is carried by a first carriage which can be moved reciprocally along said conveyor such that said at least one first electrode can make contact with an animal for slaughter carried by said conveyor during the first current pulse for the maximum duration of 10 seconds; and wherein the second electrode is carried by a second carriage which can be moved reciprocally along said conveyor such that said second electrode can make contact with an animal for slaughter carried by said conveyor during the second current pulse for a maximum duration of 10 seconds.

15. Device as claimed in claim 14, further comprising means for lowering the transition resistance between the electrodes and the animal.

16. Device as claimed in claim 15, wherein the second electrode is adapted to be pressed against the thorax region of the animal such that the second current pulse is caused to flow to at least a significant degree through the heart region.

17. Device as claimed in claim 15, further comprising a pressing device for pressing the electrodes against the animal with predetermined forces.

18. Device as claimed in claim 14, wherein the first carriage comprises the second carriage.

19. Device as claimed in claim 14, wherein the at least one second electrode forms part of an outer surface of the conveyor.

* * * * *